(No Model.)
G. DUPONT-DENNIS.
PROCESS OF PRESERVING VEGETABLES.
No. 517,267. Patented Mar. 27, 1894.
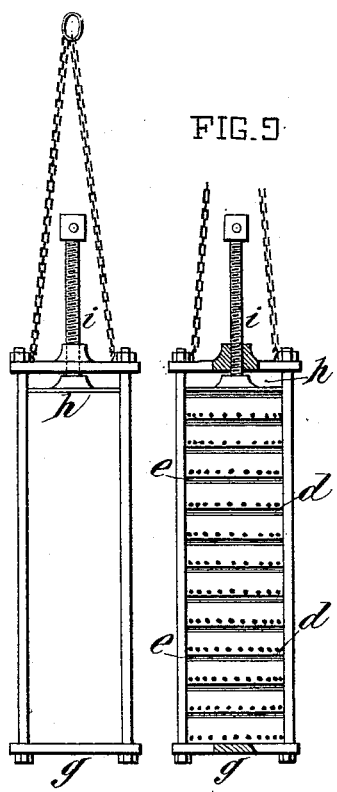

UNITED STATES PATENT OFFICE.

GABRIEL DUPONT-DENNIS, OF NANTES, FRANCE.

PROCESS OF PRESERVING VEGETABLES.

SPECIFICATION forming part of Letters Patent No. 517,267, dated March 27, 1894.

Application filed November 23, 1892. Serial No. 452,900. (No model.) Patented in France December 3, 1891, No. 217,822; in Belgium May 11, 1892, No. 99,641, and in Spain June 18, 1892, No. 13,389.

*To all whom it may concern:*

Be it known that I, GABRIEL DUPONT-DENNIS, of the city of Nantes, France, have invented an Improved Process of Preserving Dried Vegetables, (for which I have obtained Letters Patent in France for fifteen years, dated December 3, 1891, No. 217,822; in Belgium for fifteen years, dated May 11, 1892, No. 99,641, and in Spain for twenty years, dated June 18, 1892, No. 13,389,) of which the following is a full, clear, and exact description.

This invention relates to an improved process of preserving dried vegetables in a cooked condition, and it consists in a special method of preparing the vegetables on a large scale as hereinafter described.

Reference is to be had to the accompanying drawings forming a part of this specification wherein—

Figures 1 and 2 represent an elevation and plan view respectively of a charger employed for the preliminary steeping of the vegetables. Figs. 3, 4 and 5 show respectively an elevation, vertical section and plan view of a vessel for containing the vegetables during the cooking operation. Fig. 6 represents the wire cloth or false bottom with which said vessel is provided. Figs. 7 and 8 represent an elevation and plan of a clamping frame for holding and closing steam tight a number of the said vessels represented in Figs. 3, 4 and 5. Fig. 9 represents a vertical section of the holder with the superposed vessels secured therein. Fig. 10 is a plan of one of the covers for the cooking vessels, and Fig. 11 is a plan of a tray into which the cooked vegetables are discharged.

In treating haricot beans according to this process for the purpose of preserving them, the haricots which have first been dried are placed in the charger represented in Figs. 1 and 2, the sides and bottom of which are made of wire cloth $a$. The charger is then lowered by means of a crane into a tank filled with cold water, the temperature of which is brought to 30° centigrade and then further raised at certain intervals of say half an hour to 50° centigrade. After steeping for some time (for instance twenty-four to forty-eight hours) the charger is raised out of the water by means of the crane and the vegetables plunged in a saturated solution of salt and water at a temperature of 50° centigrade. The vegetables are then transferred to the vessels in which they are to be cooked. For this purpose I preferably use a series of vessels such as represented in Figs. 3, 4 and 5 which are made with a closed bottom $b$, and intermediate of which bottom and top of the cooking vessel is placed a strong wire cloth or perforated false-bottom $c$ (separately represented in Fig. 6), preferably supported by cross-bars of sufficient size in cross-section to prevent the false-bottom $c$ from coming in contact with the bottom proper $b$. In the vessel is placed a cloth well soaked with water upon which the haricots are placed and then covered with a similar wet cloth. Water in the proportion of one liter to five kilograms of vegetables, is then poured in over the whole mass and runs down into the chamber formed between the perforated false-bottom $c$ and the bottom proper $b$, so that the water is not in contact with the vegetables this being an essential condition for preserving the haricots whole. The sheet metal cover $d$, Fig. 10, is then placed on the vessel, after having first applied a hemp packing upon the flange riveted to the upper edge $f$ of the vessel. From ten to twelve of these vessels are placed one upon the other in the frame represented in Figs. 7, 8, and 9, which is provided with a fixed bottom plate $g$—, and with a movable plate or follower $h$ worked by a screw $i$ whereby pressure is applied upon the whole of the vessels, thus firmly clamping the covers $d$ upon their packings $e$ and preventing the admission of water or steam to the interior of the vessels. The vessels are perforated around their lower edges with holes $j$ to permit water or steam to circulate between the bottom $b$ of the one vessel and the cover of the next beneath it in order that the heat may be equally distributed as will be hereinafter referred to. When the vessels are clamped in the holder, the whole is lowered by a crane into a boiler containing water or steam at 100° centigrade which is then closed and the temperature raised to 102° centigrade and maintained at this point for two and a half hours, during which time the steam or water circulates between the various vessels as above described. After this the vessels are withdrawn and allowed to cool in order to prevent the bursting of the beans. It will be understood that the temperature and duration of the operations above described, would be varied to suit the kind, of vegetable under treatment, the figures above given being, however, those which have been found by practice to give the best results in the majority of cases. The essential feature of the process is the cooking of the vegetable or other matter without placing said matter in direct contact with the water as described, this being indispensable for the preservation of dry vegetables and by it alone can haricots be preserved whole without liability of becoming rancid. If the haricots are to be reduced to the condition of flour or meal they are dried in a kiln and then ground up and treated in the manner before described which alone permits of obtaining a meal from haricots not liable to become rancid. The principal object, however of the invention is the preservation of the haricot beans whole, a result which has never hitherto been attained. The haricots, after having been cooked by the above process and cooled in the cooking vessels, are spread out upon coarse wrapping cloth laid in trays formed of coarse meshed wire cloth (see Fig. 11) and then covered over with another coarse wrapping cloth, the object of employing these cloths being to prevent the haricots from splitting and opening during the drying which they would be liable to do if exposed to the slightest current of air, thus losing their commercial value. The haricots should be spread out side by side and not placed one on the other as otherwise they would become oily and require to be passed over a drier at a higher temperature. The haricots, spread out on trays and covered as described are placed in a stove, the temperature of which is first raised to from 15° to 18° centigrade and afterward progressively increased as the haricots become dried, but care must be taken to avoid too suddenly raising the heat, to prevent the haricots from splitting. The salt water in which the vegetables are plunged after steeping, is intended to prevent the production of small white fungi which, without this precaution were taken, would form very rapidly during the drying of the vegetables at a low temperature. After complete desiccation, which requires from two to three days, the vegetables are to be turned out on the floor of a dry house.

It will be understood that the temperatures, the duration of the operations, and the other conditions, may be varied to suit the nature of the vegetable to be treated and the other attendant circumstances.

I do not claim herein the apparatus for carrying out the process above described, the said apparatus forming the subject matter of a separate application, Serial No. 485,015, dated August 12, 1893.

I claim—

The process of treating haricot beans and the like for their preservation, which consists in submerging such dried beans in water at about 30° centigrade, then raising the temperature to 50° centigrade; removing the vegetable and submerging in saturated brine at like temperature; spreading in alternate layers between cloths; then cooking in closed vessels; spreading between coarse fabric in trays, and drying, while thus confined, in closed chambers at a lower temperature, as set forth.

The foregoing specification of my improved process of preserving dried vegetables signed by me this 31st day of October, 1892.

GABRIEL DUPONT-DENNIS.

Witnesses:
PIERRE DE LISE DU DRENEUE,
PITRE BONNET.